United States Patent
Bayerle et al.

(10) Patent No.: US 7,941,266 B2
(45) Date of Patent: May 10, 2011

(54) METHOD AND DEVICE FOR CONTROLLING AN INTERNAL COMBUSTION ENGINE IN STOP/START OPERATION

(75) Inventors: Klaus Bayerle, Obertraubling (DE); Frank Hacker, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 139 days.

(21) Appl. No.: 12/331,559

(22) Filed: Dec. 10, 2008

(65) Prior Publication Data
US 2009/0157284 A1 Jun. 18, 2009

(30) Foreign Application Priority Data
Dec. 13, 2007 (DE) .......................... 10 2007 060 019

(51) Int. Cl.
G06F 19/00 (2011.01)
G06G 7/70 (2006.01)

(52) U.S. Cl. ..................... 701/112; 701/113; 123/179.3; 123/179.4

(58) Field of Classification Search .................. 701/112, 701/113; 123/179.4, 179.3
See application file for complete search history.

(56) References Cited

U.S. PATENT DOCUMENTS

| | | | |
|---|---|---|---|
| 5,653,659 A * | 8/1997 | Kunibe et al. ................. | 477/111 |
| 6,301,529 B1 * | 10/2001 | Itoyama et al. ................. | 701/22 |
| 6,305,343 B1 * | 10/2001 | Sato et al. ............... | 123/198 DB |
| 6,779,516 B1 | 8/2004 | Shureb .......................... | 123/572 |
| 7,079,941 B2 * | 7/2006 | Tetsuno et al. ................ | 701/112 |
| 7,212,910 B2 * | 5/2007 | Akasaka ........................ | 701/112 |
| 7,458,353 B2 * | 12/2008 | Takahashi ................... | 123/179.4 |
| 7,653,478 B2 * | 1/2010 | Park ............................... | 701/112 |
| 7,668,642 B2 * | 2/2010 | Fuwa et al. .................... | 701/112 |
| 2004/0210379 A1 | 10/2004 | Kirschke et al. .............. | 701/114 |
| 2009/0030595 A1 * | 1/2009 | Sugai ............................. | 701/112 |
| 2009/0306843 A1 * | 12/2009 | Jinno et al. ...................... | 701/22 |

FOREIGN PATENT DOCUMENTS

| | | |
|---|---|---|
| DE | 10147977 | 9/2001 |
| DE | 102004044473 | 9/2004 |
| DE | 102006043678 | 9/2006 |

OTHER PUBLICATIONS

Machine Translation of previously cited document DE 10 2004 044 473 A1.*

* cited by examiner

*Primary Examiner* — Stephen K Cronin
*Assistant Examiner* — Anthony L Bacon
(74) *Attorney, Agent, or Firm* — King & Spalding L.L.P.

(57) ABSTRACT

In a method for controlling an internal combustion engine (1) for a motor vehicle in stop-start operation, the internal combustion engine (1) is operated in the idling operating state. If there is a request for switch-off of the internal combustion engine (1) the torque produced by the internal combustion engine (1) is reduced while fuel continues to be injected. The fuel injection is switched off if the speed of the internal combustion engine (1) reaches a predetermined minimum value. The torque produced by the internal combustion engine (1) is increased again if the request for switching off the internal combustion engine (1) is canceled before the minimum speed is reached.

18 Claims, 3 Drawing Sheets

METHOD AND DEVICE FOR CONTROLLING AN INTERNAL COMBUSTION ENGINE IN STOP/START OPERATION

CROSS-REFERENCE TO RELATED APPLICATIONS

This application claims priority to German Patent Application No. 10 2007 060 019.6 filed Dec. 13, 2007, the contents of which is incorporated herein by reference in its entirety.

TECHNICAL FIELD

The present invention relates to a method and a device for controlling an internal combustion engine for a motor vehicle in stop/start operation.

BACKGROUND

To reduce fuel consumption and $CO_2$ emissions different concepts are implemented in modern motor vehicles which improve the internal combustion engine efficiency, the exhaust cleaning or the aerodynamics of the motor vehicle. One of these concepts for reducing the fuel consumption is what is known as stop/start operation. In this mode of operation the internal combustion engine is switched off during longer periods when the vehicle is stationary. Since, especially with otto engines, the efficiency of the internal combustion engine is greatly reduced when idling, considerable savings in fuel consumption can be obtained in this way, for example in the urban driving cycle.

In a known method for stop/start operation of a motor vehicle the internal combustion engine is switched off if the motor vehicle is idling for a specific time. The internal combustion engine is switched off automatically by switching off the fuel injection. After the switch-off of the fuel feed, because of the inertia of the crankshaft and the piston, it takes a certain time, typically between 500 and 2000 ms, until the engine speed has dropped from idling speed to zero. Problems arise if the driver of the vehicle wishes to run the internal combustion again during this switch-off phase. To do this torque must be built up by restarting the fuel feed and with otto engines by restarting the ignition. This however involves significant control effort for correctly dispensing the quantity of fuel to be fed as well as for correct synchronization of the fuel injection with the ignition. If too much fuel is supplied, the result can be wall film formation and thereby an increased emission of pollutants. If too little fuel is supplied, the torque build-up is inadequate and the internal combustion engine can stall. Similar problems arise with inadequate synchronization of the fuel injection and the ignition. Establishing sufficient torque is additionally made difficult by the fact that the speed on switch-off of the fuel feed falls with a very steep gradient. All these problems result in the establishment of a sufficient torque during of the switch-off of the internal combustion engine only being possible down to speeds just below the idling speed. If the speed of the internal combustion engine has fallen too far, the internal combustion engine can only be started again from its completely stopped state with the aid of the starter. Because of the high control overhead this method involves the danger of a delayed start behavior in stop/start operation and an increase in pollutant emissions during restart.

SUMMARY

According to various embodiments, a method and a device for control of an internal combustion engine for a motor vehicle in stop/start operation can be provided by means of which the stop/start operation can be improved.

According to an embodiment, a method for controlling an internal combustion engine for a motor vehicle in stop-start operation, may comprise the steps of: in the event of a request for the switch-off of the internal combustion engine, reducing the torque produced by the internal combustion engine while fuel injection is continued such that the speed of the internal combustion engine falls to below a predetermined setpoint idling speed, wherein the fuel injection is only switched off if a condition is fulfilled.

According to a further embodiment, the condition can be fulfilled if the speed of the internal combustion engine has reached a predetermined minimum speed which is less than the setpoint idling speed. According to a further embodiment, the minimum speed can be dimensioned so that at this minimum speed the torque produced by the internal combustion engine can no longer be increased. According to a further embodiment, uneven running of the internal combustion engine can be determined and the condition can be fulfilled if the uneven running exceeds a predetermined limit value. According to a further embodiment, the torque produced by the internal combustion engine can be increased again if the request for switch-off of the internal combustion engine is canceled again before the condition is fulfilled. According to a further embodiment, the internal combustion engine can be operated such that the fuel last injected before the switching off of the fuel injection is burned. According to a further embodiment, the torque produced by the internal combustion engine can be reduced and increased by appropriate variation of the ignition time. According to a further embodiment, the torque produced by the internal combustion engine can be reduced and increased by appropriate variation of the quantity of fuel injected. According to a further embodiment, the request for switch-off of the internal combustion engine can be made if the internal combustion engine is idling for longer than a predetermined period of time. According to a further embodiment, the torque produced by the internal combustion engine can be reduced in such a way that the drop in speed of the internal combustion engine caused thereby occurs with a predetermined gradient. According to a further embodiment, the reduction and increase of the torque produced by the internal combustion engine can be undertaken using an idling control.

According to another embodiment, a control device for an internal combustion engine of a motor vehicle, can be operable, in stop-start operation, such that in the event of there being a request for the switch-off of the internal combustion engine the torque produced by the internal combustion engine is reduced while fuel injection is continued such that the speed of the internal combustion engine falls to below a predetermined setpoint idling speed, and the fuel injection is only switched off if a condition is fulfilled.

BRIEF DESCRIPTION OF THE DRAWINGS

The invention is explained in more detail below based on an exemplary embodiment which refers to the enclosed figures. The following drawings are shown in the figures.

DETAILED DESCRIPTION

Figure 1:
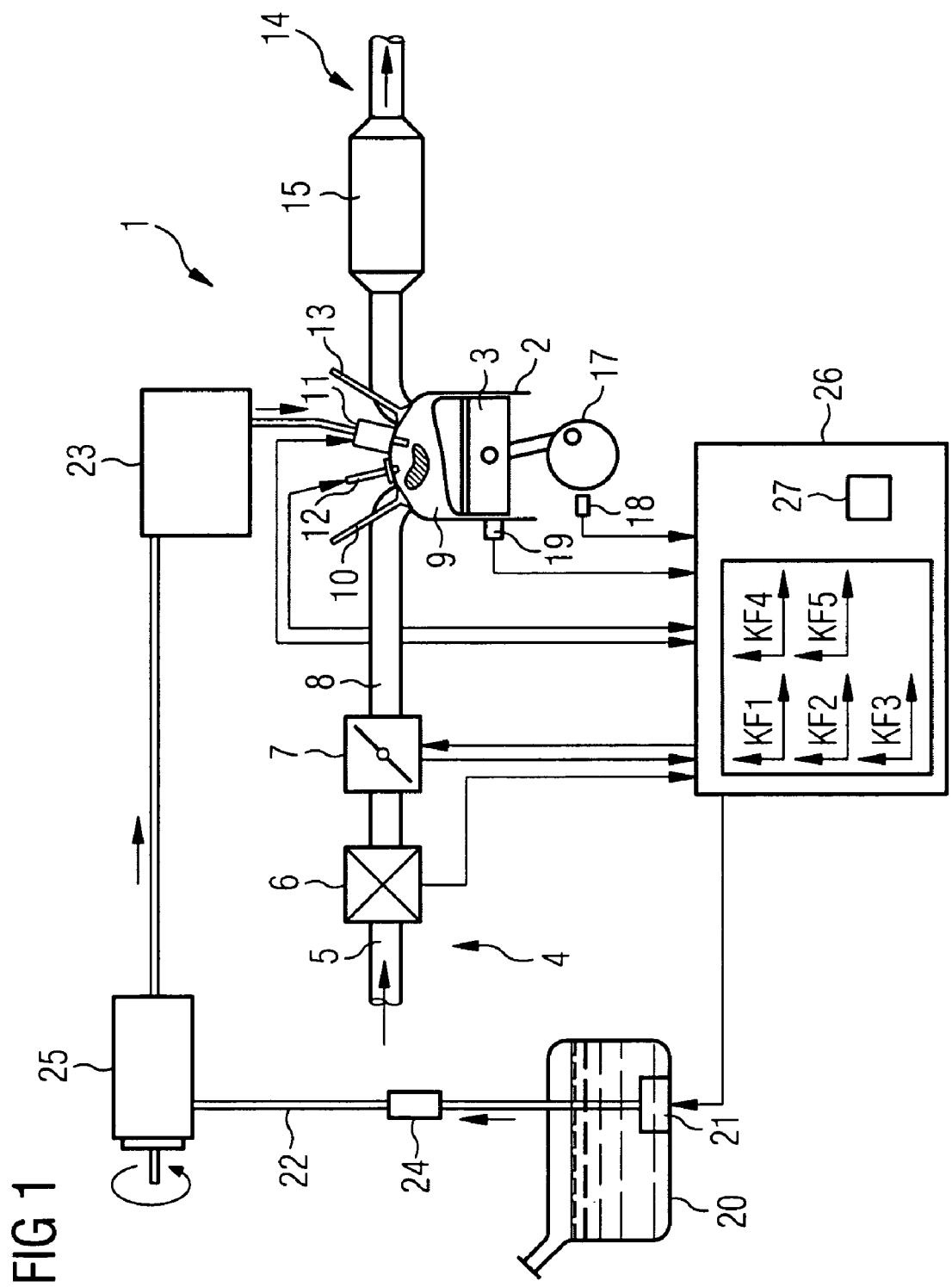
FIG. 1 a schematic diagram of an internal combustion engine.

In a method for controlling an internal combustion engine for a motor vehicle in stop/start operation in accordance with an embodiment, if there is a request for switching off the internal combustion engine the speed of the internal combustion engine falls during ongoing fuel injection below a pre-determined setpoint idle speed. The fuel injection is only switched off if a condition is fulfilled.

The idea underlying according to the various embodiments is to be seen as performing the switch-off process of the internal combustion engine in the most controlled manner possible. To this end the torque is reduced in a controlled manner while maintaining the fuel injection and the speed of the internal combustion engine is reduced in this way to below the setpoint idling speed. The synchronization between the fuel injection and the ignition is maintained in such cases, which means that, until the condition for switching off the fuel injection is fulfilled, a rapid toque reduction while avoiding wall film formation and bad emission values can be achieved. Furthermore the engine speed curve can be controlled and adjusted in a flexible manner in this way. This makes a rapid restart of the internal combustion engine prior to fuel injection being switched off significantly easier. The setpoint idle speed in this case is to be understood as the "normal" setpoint speed value to which the internal combustion engine is set by an idling control, if the vehicle is standing at the traffic lights with its engine running and the drive train opened for example. With the engine warmed up to operating temperature the setpoint idle speed typically amounts to 700-800 rpm.

In an embodiment of the method according to an embodiment the condition for switching off fuel injection is fulfilled if the speed of the internal combustion engine reaches a predetermined minimum speed which is lower than the setpoint idle speed.

This embodiment enables the conditions for switching off the fuel injection to be coupled in a simple manner to the speed of the internal combustion engine. Since the value of the speed of the internal combustion engine is always available the switch-off condition can be monitored in a simple manner. It is also possible, by appropriate calibration, to adapt the value of the minimum speed to the respective requirements and type of the internal combustion engine. It is also conceivable to vary the minimum speed as a function of other parameters, for example the temperature of the coolant or of the oil.

In an embodiment of the method according to a further embodiment the minimum speed is dimensioned so that at this minimum speed the torque produced by the internal combustion engine can no longer be increased.

The torque of the internal combustion engine can no longer be increased if the energy released during the combustion of an air/fuel mixture still to be supplied and the rotation energy of the internal combustion engine at this minimum speed are no longer sufficient to increase the speed of the internal combustion engine and avoid a complete stop. A typical value for the minimum speed lies at appr. 200 revolutions per minute, which is far below the usual values for the setpoint idle speed (700 to 800 revolutions per minute). In this way the controlled speed reduction and thereby the controlled speed curve until the minimum speed is reached can be extended as far as possible and the actual switch-off of the fuel injection delayed as long as possible. This makes a rapid restart of the internal combustion engine possible on detection of a corresponding driver request.

In an embodiment of the method according to a further embodiment uneven running of the internal combustion engine is determined, with the conditions for switching off the fuel injection then being deemed to be fulfilled when the uneven running exceeds a predetermined limit value.

In this embodiment the speed of the internal combustion is only reduced to the point at which the uneven running exceeds a pre-determined limit value. This enables a lumpy and uncomfortable running behavior of the internal combustion engine to be avoided. The uneven running can for example be determined in such cases by evaluating the signal of a rotational speed sensor.

In an embodiment of the method according to a further embodiment the torque produced by the internal combustion engine is increased again if the request to switch off the internal combustion engine is canceled again before the condition is fulfilled.

In this way the motor vehicle can assume its driving mode again very rapidly without the internal combustion having to be restarted by an electrical starter. In such cases the torque can follow a torque requirement from the driver or is only increased until such time as the speed of the internal combustion engine is regulated to the setpoint idle speed.

In an embodiment of the method according to a further embodiment the internal combustion engine is operated so that the last fuel injected before the fuel injection was switched off is still burned.

In an otto engine the ignition is thus carried out until the last combustion mixture supplied has been burned. With a diesel engine the last fuel injection occurs at a speed at which the combustion mixture is still sufficiently compressed and the fuel last injected can be burned. In this way a wall film formation and a deterioration of the exhaust gas values can be avoided.

In the embodiments of the method according to further embodiments the reduction and increase in the torque produced by the internal combustion engine occurs either through corresponding modification of the injection time or of the quantity of fuel injected.

The measure for setting the torque by altering of the ignition time is suitable for otto engines in homogeneous mode, by altering the quantity of fuel injected it is suitable for otto engines using charge stratification and for diesel engines. In both cases the torque of the internal combustion engine is easy to control and can be rapidly varied.

In an embodiment of the method according to a further embodiment there is a request for switching off the internal combustion engine if the internal combustion engine is idling for longer than a predetermined time.

Automatically switching off the internal combustion engine when it is idling enables a perceptible fuel saving to be achieved. Idling here is understood as the state in which the speed of the internal combustion engine is regulated to a setpoint idling speed.

In an embodiment of the method according to a further embodiment the torque produced by the internal combustion engine is reduced such that the speed reduction of the internal combustion engine produced in this way occurs with a pre-determined gradient.

In this way the speed gradient is adjustable and can be adapted to the different operating conditions. Thus for example the speed gradient can always be set for different operating temperatures of the internal combustion engine so that a secure and fast torque build-up and thereby an increase in torque until the speed is reached is possible. In this way an increased flexibility and operational safety in stop/start operation is produced.

In an embodiment of the method according to a further embodiment the torque produced by the internal combustion engine is reduced by using an idling control.

By using a normally implemented idling control for executing the method, only a few additional control functions are necessary for executing the method. This enables the software, data provision and development outlay to be significantly reduced. Furthermore, by means of the idling control, of which the control variable is the speed of the internal combustion engine, it is especially simple to set a predetermined speed gradient when reducing the speed down to the minimum speed.

A control device for an internal combustion engine of the motor vehicle according to a further embodiment is embodied so as to enable it to execute one of the above described methods. The reader is referred to the embodiments relating to the above described methods as regards the advantages produced.

FIG. 1 shows a schematic diagram of an internal combustion engine 1 which is embodied as an otto engine for a motor vehicle (not shown). For reasons of improved clarity the diagram is shown greatly simplified.

The internal combustion engine 1 comprises at least one cylinder 2 and a piston 3 able to be moved up and down in the cylinder 2. The internal combustion engine 1 further comprises an induction tract 4, in which an air mass sensor 5, a throttle flap 8, as well as a suction tube 8 are arranged downstream of an induction opening 5 for sucking in fresh air. The induction tract 4 opens out into a combustion chamber 9 delimited by the cylinder 2 and the piston 3. The fresh air needed for combustion is introduced via the induction tract 4 into the combustion chamber 9, with the fresh air supply being controlled by opening and closing an inlet valve 10. The internal combustion engine 1 shown here is an internal combustion engine 1 with direct fuel injection, in which the fuel needed for combustion is injected directly via an injection valve 11 into the combustion chamber 9. A spark plug 12 which also projects into the combustion chamber 9 serves to ignite the combustion mixture. The combustion exhaust gases are discharged via an exhaust valve 13 into an exhaust gas tract 14 of the internal combustion engine 1 and cleaned by means of an exhaust gas catalytic converter 15 arranged in the exhaust gas tract 14.

Power is transmitted to a power train of a motor vehicle (not shown) via a crankshaft 17 coupled to the piston 3. The internal combustion engine 1 also has a rotational speed sensor 18 for determining the speed of the crankshaft 17 as well as a temperature sensor 19 for detecting the coolant temperature.

The internal combustion engine 1 has a fuel supply system which features a fuel tank 20 as well as a fuel pump 21 arranged therein. The fuel is supplied to the fuel pump 21 by means of a supply line 22. Arranged in the supply line 22 are a fuel filter 24 and a high-pressure pump 25. The high-pressure pump 25 serves to convey the fuel supplied at a relatively low pressure (appr. 3-5 bar) by the fuel pump 21 to a pressure reservoir 23 at high pressure (typically up to 150 bar). This reservoir is a common pressure reservoir 23 from which the injection valves 11 for a number of cylinders 2 are supplied with fuel under pressure.

The internal combustion engine 1 is assigned a control device 26 which is connected via signal and data lines to all actuators and sensors of the internal combustion engine 1. Implemented by software in the control device 26 are engine map-based engine control functions (KF1 to KF5), especially an idle control 27. The idle control is known to be embodied so that it regulates the speed of the internal combustion engine to an idle speed and thus prevents the internal combustion engine 1 from stalling. Based on the measured values of the sensors and engine map-based engine control functions, control signals are sent out to the actuators of the internal combustion engine 1 and of the fuel supply system. In concrete terms the control device 26 is coupled via data and signal lines to the fuel pump 21, the air mass sensor 6, the throttle flap 7, the spark plugs 12, the injection valve 11, the temperature sensor 19 and the rotational speed sensor 18.

An exemplary embodiment for a control method for the internal combustion engine 1 in stop/start operation is explained in greater detail below with reference to the flowchart of FIG. 2 and the diagrams depicted in FIGS. 3A and 3B. FIG. 3A shows the graph of speed plotted over time for a typical situation in stop/start operation of the internal combustion engine 1. FIG. 3B shows the value of the switch-off request in the form of a logical variable for two different cases over time.

The method is started in step 200, for example when the ignition is switched on or when the internal combustion engine 1 is started up.

FIG. 3A shows an example of the speed curve for a typical driving situation of the motor vehicle (not shown). In the period from t0 to t1 the motor vehicle is for example approaching a red light. A vehicle driver reduces the speed of the motor vehicle, which at a point in time t1 comes to a standstill. The speed of the internal combustion engine 1 therefore reduces from point in time t0 to t1 down to idling speed. At point in time t1 therefore the internal combustion engine 1 is idling. Idling in this case is to be understood as the operating state of the internal combustion engine 1 in which the speed of the internal combustion engine 1 is regulated by the idling control 27 to a predetermined setpoint idling speed. For motor vehicles with manual transmissions the power train is opened during idling. For motor vehicles with automatic transmissions these can either be set to "Neutral" or to "Drive".

Figure 2:
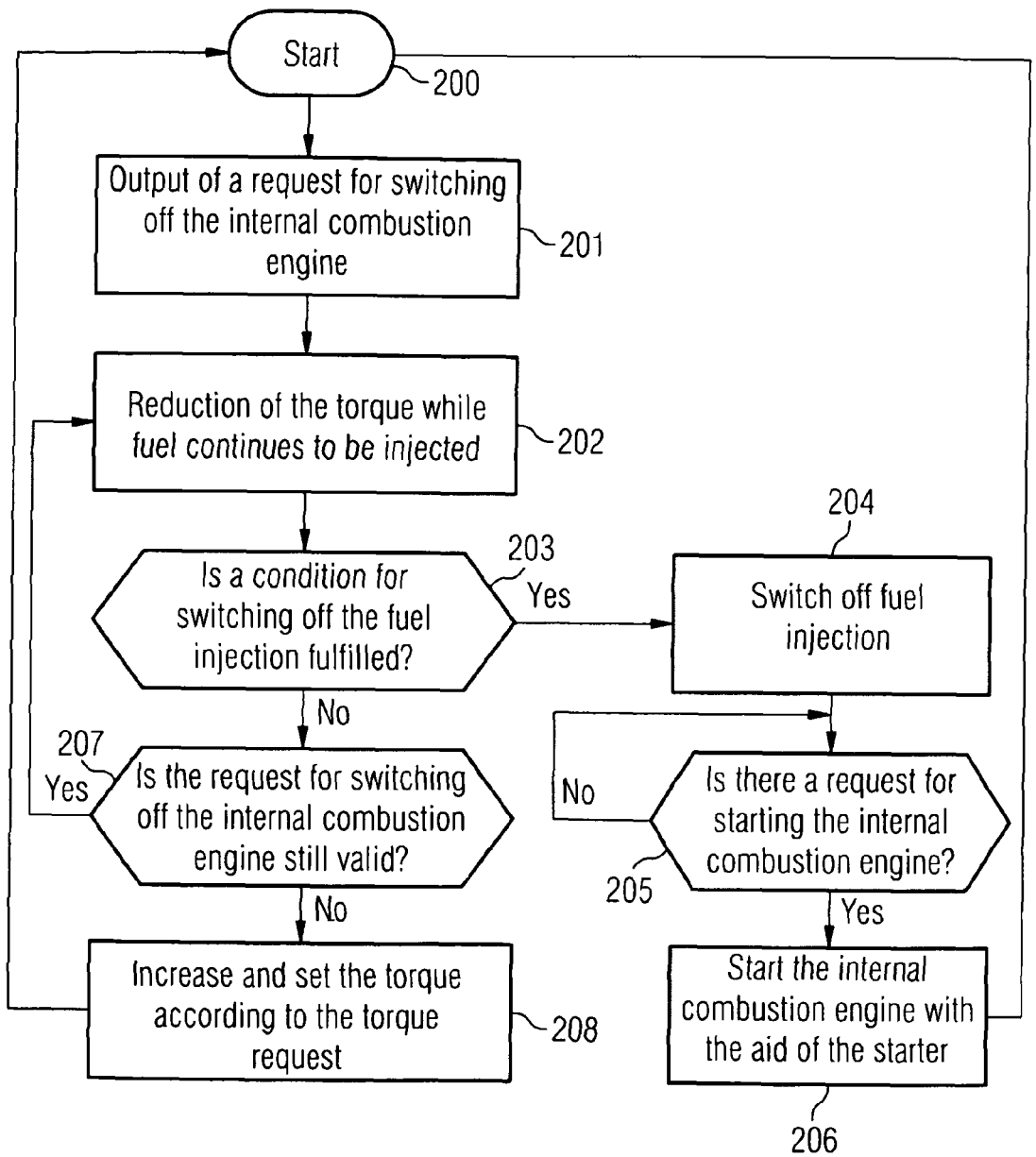
FIG. 2 an exemplary embodiment of a control method for an internal combustion engine in the form of a flowchart.
Figure 3A:
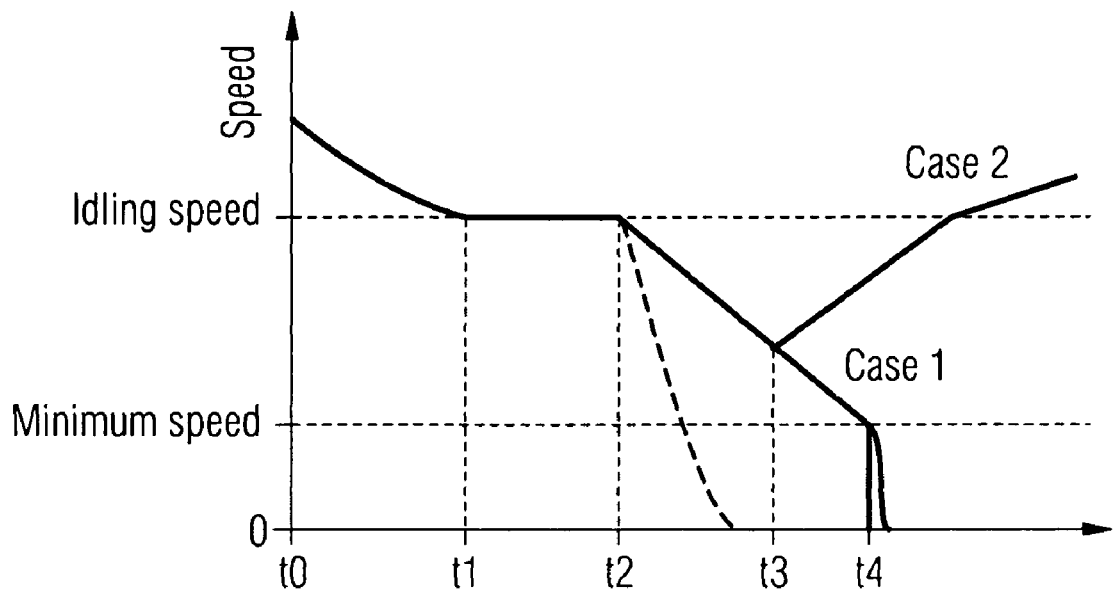
FIGS. 3A, 3B schematic diagrams for explaining the method in accordance with FIG. 2.
Figure 3B:
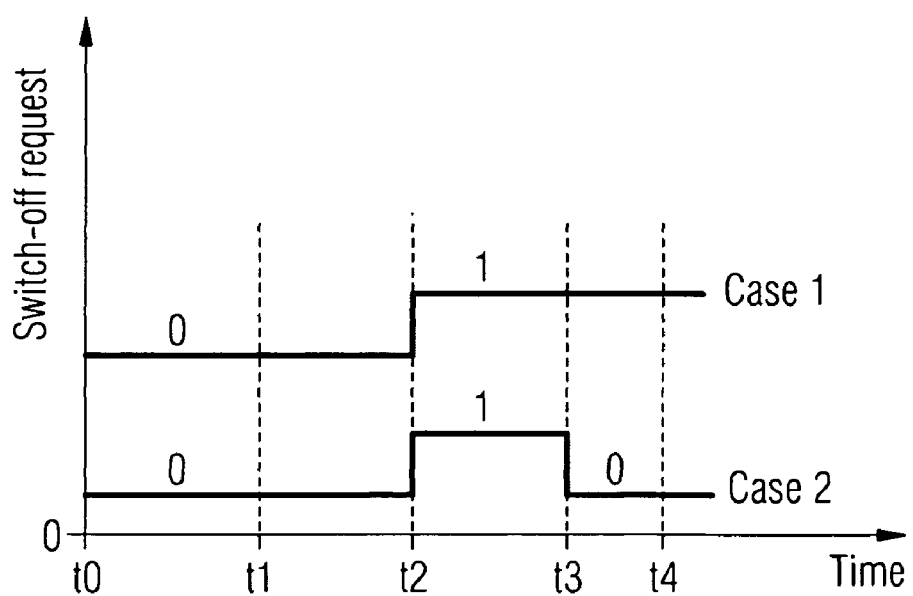

For the flowchart shown in FIG. 2 a request for switching off the internal combustion engine is output by the control device in step 201. The output of this switch-off request in this case is independent of a switch-off request by the vehicle driver and occurs when a predetermined condition is fulfilled or if specific operating states exist. For example such a switch-off request can be output if the internal combustion engine 1 is idling for a predetermined period of time. For further illustration the reader is again referred to FIGS. 3A and 3B, which show that at point in time t2 the internal combustion engine 1 was idling for the predetermined period of time, whereas at point in time t2 the logical variable is set for the switch-off request from 0 to 1. It is pointed out however that the invention is not restricted to this switch-off condition, but that any other switch-off conditions are conceivable which help to save fuel.

In the flowchart of FIG. 2 the method continues with step 202, in which the speed of the internal combustion engine is reduced to below the idle setpoint speed. This is done by reducing the torque produced by the internal combustion engine 1 while continuing the fuel injection. As becomes clear with reference to FIG. 3A, as from point in time t2, because of the reduction of the torque, there is a resulting drop in the speed of the internal combustion engine 1. The reduction of the torque can occur in the case of an otto engine by corresponding variation of the ignition angle or of the ignition time. With a diesel engine or with an otto engine with direct fuel injection in specific operating states (charge stratification) the reduction in torque can also be achieved by reducing the quantity of fuel injected. In an advantageous manner the torque can be reduced or the speed of the internal combustion engine 1 is dropped by the idling control 27. This can for example be done by the idling control regulating the speed of the internal combustion engine to a further setpoint value which, starting from the setpoint idle speed, is preferably reduced via a ramp function. In this case the gradient for the speed reduction or the dropping of the speed can be flexibly predetermined, which allows the speed reduction to be well controlled.

In FIG. 3A the speed curve produced by the method shown here is indicated by a solid line. By comparison, the curve of the speed of the internal combustion engine 1 which would be produced for an immediate switch-off of the fuel injection as from the point in time t2 is shown as a dashed line. It is immediately apparent that by the controlled reduction of the torque or the dropping of the speed of the internal combustion engine 1, a far flatter gradient can be implemented for the speed reduction.

In FIG. 2 the method continues with step 203, in which a check is made as to whether a condition for switch-off of the fuel injection is fulfilled. The condition can for example be fulfilled if uneven running of the internal combustion engine exceeds a predetermined limit value, i.e. if an uncomfortable running behavior of the internal combustion engine 1 is detected. For example, by evaluating the signal of the rotational speed sensor 18 the uneven running of the internal combustion engine 1 can be deduced. The amplitude, the frequency or the gradient of the speed fluctuations represent a measure for the uneven running. The condition can also count as fulfilled if the speed of the internal combustion engine 1 reaches a predetermined minimum speed. The value of the minimum speed is dimensioned in such cases so that at the minimum speed it is no longer possible to build up a torque. This is the case if the rotation energy of the internal combustion engine at the minimum speed is so small that the energy released during the combustion at this speed is no longer adequate to increase the speed or the produced torque of the internal combustion engine 1 again.

If the result of the request in the step 203 is positive, in step 204 the fuel injection is switched off, which causes the internal combustion engine 1 to come to a stop (speed is equal to zero). This situation is identified in FIGS. 3A and 3B as case 1. It is evident here that the speed of the internal combustion engine 1 falls by reducing the produced torque from point in time t2 until the minimum speed is reached at point in time t4 with a specific predetermined gradient. The switch-off request remains active up to point in time t4. At point in time t4 the speed of the internal combustion engine reaches the minimum speed and the fuel injection is switched off. The speed then falls with a very steep gradient to zero, i.e. until the total standstill of the internal combustion engine 1. As from point in time t4, i.e. after the switch-off of the fuel injection, a restart of the internal combustion engine is only possible with the aid of a starter (not shown). Alternatively the uneven running of the internal combustion engine 1 can exceed the limit value at point in time t4, so that the fuel injection is switched off for this reason.

In FIG. 2 the method continues after step 204 with step 205, in which a query is made as to whether a requirement for starting of the internal combustion engine 1 is present. This can for example be when the vehicle driver actuates the gas pedal. The query is repeated until a positive result is obtained. In this case the internal combustion engine 1 is started again in step 206 with the aid of the starter. Thereafter the method can be started once more with step 200.

For a negative result of the query in step 203, a check is made in step 207 as to whether the request for the switch-off of the internal combustion engine 1 is still valid. For a positive result of the request the method is repeated, starting from step 203.

For a negative result of the query in 207, in the event of the request for the switch-off of the internal combustion engine 1 no longer being active or valid, the method continues with step 208. Since in this case the internal combustion engine 1 is not to be stopped, for example if the driver wishes to drive on, the torque produced by the internal combustion engine is increased again and adjusted in accordance with the torque request from the vehicle driver.

This situation is identified in FIGS. 3A and 3B as case 2. At point in time t3 the request for the switch-off of the internal combustion engine is invalid, for example because the driver is actuating the gas pedal. As is evident from FIG. 3B, at point in time t3 the logical variable for the switch-off request at point in time t3 is zeroed. As is shown in FIG. 3A, the speed increases again as from point in time t3 because of the increase in torque. Like the reduction in torque the build-up in torque can be undertaken again by the corresponding variation of the ignition angle or the quantity of fuel injected.

After step 208 the method can be started again with step 200.

The method shown here offers the advantage that the switch-off of the internal combustion engine 1 in stop/start operation is undertaken in a controlled manner. Since the reduction in torque or the dropping of the engine speed to below the setpoint idle speed occurs while fuel is continuing to be injected, the synchronization between fuel injection and ignition is retained. Furthermore the speed gradient with which the speed is reduced can be set in any way required. This produces the advantage that, with a sudden cancelation of the switch-off request, torque can be built up again rapidly. This greatly improves the drivability in stop/start operation. Furthermore increased emissions by wall film formation, imprecise implementation of the fuel quantity to be injected or deficient synchronization between fuel injection and ignition can be avoided.

What is claimed is:

1. A method for controlling an internal combustion engine for a motor vehicle in stop-start operation, comprising the steps of:
   in response to a request for a switch-off of the internal combustion engine, controllably reducing the torque produced by the internal combustion engine while fuel injection is continued such that the speed of the internal combustion engine falls to below a predetermined setpoint idling speed,
   wherein the torque reduction is controlled such that the speed of the internal combustion engine is reduced in a controlled manner from (a) the predetermined setpoint idling speed (b) to a fuel injection switch-off speed at which a predetermined condition is met, the controlled manner of the speed reduction providing a less rapid reduction of speed than if the fuel injection was stopped upon the request for the switch-off of the internal combustion engine,
   if the request for switch-off of the internal combustion engine is canceled during the reduction of torque from the predetermined setpoint idling speed to the fuel injection switch-off speed, and before the fuel injection switch-off speed is reached, increasing the torque to or above the predetermined setpoint idling speed; and
   if the request for switch-off of the internal combustion engine is not canceled by the time the fuel injection switch-off speed is reached, switching off the fuel injection such that the speed of the internal combustion engine rapidly falls to zero.

2. The method according to claim 1, wherein the fuel injection switch-off speed at which a predetermined condition is met comprises predetermined minimum speed which is less than the setpoint idling speed.

3. The method according to claim 2, wherein the minimum speed is dimensioned so that at this minimum speed the torque produced by the internal combustion engine can no longer be increased.

4. The method according to claim 1, further comprising determining uneven running of the internal combustion engine, and
wherein the fuel injection switch-off speed at which a predetermined condition is met comprises a speed at which the uneven running exceeds a predetermined limit value.

5. The method according to claim 1, wherein the internal combustion engine is operated such that the fuel last injected before the switching off of the fuel injection is burned.

6. The method according to claim 1, wherein the torque produced by the internal combustion engine is reduced and increased by appropriate variation of the ignition time.

7. The method according to claim 1, wherein the torque produced by the internal combustion engine is reduced and increased by appropriate variation of the quantity of fuel injected.

8. The method according to claim 1, wherein the request for switch-off of the internal combustion engine is automatically made if the internal combustion engine is idling for longer than a predetermined period of time.

9. The method according to claim 1, wherein the torque produced by the internal combustion engine is reduced in such a way that the controlled manner of the speed reduction of the internal combustion engine occurs with a predetermined gradient.

10. The method according to claim 1, wherein the reduction and increase of the torque produced by the internal combustion engine is undertaken using an idling control.

11. A control device for an internal combustion engine of a motor vehicle, the control device being operable, in stop-start operation, to:
in response to a request for a switch-off of the internal combustion engine, controllably reducing the torque produced by the internal combustion engine while fuel injection is continued such that the speed of the internal combustion engine falls to below a predetermined setpoint idling speed,
control the torque reduction such that the speed of the internal combustion engine is reduced in a controlled manner from (a) the predetermined setpoint idling speed (b) to a fuel injection switch-off speed at which a predetermined condition is met, the controlled manner of the speed reduction providing a less rapid reduction of speed than if the fuel injection was stopped upon the request for the switch-off of the internal combustion engine,
if the request for switch-off of the internal combustion engine is canceled during the reduction of torque from the predetermined setpoint idling speed to the fuel injection switch-off speed, and before the fuel injection switch-off speed is reached, increase the torque to or above the predetermined setpoint idling speed; and
if the request for switch-off of the internal combustion engine is not canceled by the time the fuel injection switch-off speed is reached, switch off the fuel injection such that the speed of the internal combustion engine rapidly falls to zero.

12. The control device according to claim 11, wherein the fuel injection switch-off speed at which a predetermined condition is met comprises a predetermined minimum speed which is less than the setpoint idling speed.

13. The control device according to claim 12, wherein the minimum speed is dimensioned so that at this minimum speed the torque produced by the internal combustion engine can no longer be increased.

14. The control device according to claim 11, further being operable to determine uneven running of the internal combustion engine, and
wherein the fuel injection switch-off speed at which a predetermined condition is met comprises a speed at which the uneven running exceeds a predetermined limit value.

15. The control device according to claim 11, wherein the internal combustion engine is operated such that the fuel last injected before the switching off of the fuel injection is burned.

16. The control device according to claim 15, wherein the torque produced by the internal combustion engine is reduced and increased by appropriate variation of the ignition time.

17. The control device according to claim 15, wherein the torque produced by the internal combustion engine is reduced and increased by appropriate variation of the quantity of fuel injected.

18. The control device according to claim 15, wherein the request for switch-off of the internal combustion engine is automatically made if the internal combustion engine is idling for longer than a predetermined period of time.

* * * * *